United States Patent [19]
Noguchi et al.

[11] Patent Number: 5,333,954
[45] Date of Patent: Aug. 2, 1994

[54] ROLLING/SLIDING PART

[75] Inventors: Shoji Noguchi; Satoru Aihara, both of Kanagawa, Japan

[73] Assignee: NSK Ltd., Tokyo, Japan

[21] Appl. No.: 41,586

[22] Filed: Apr. 5, 1993

[30] Foreign Application Priority Data

Apr. 6, 1992 [JP] Japan ................... 4-112341

[51] Int. Cl.$^5$ .................... F16C 17/00; F16C 33/58
[52] U.S. Cl. ................... 384/26; 384/492; 384/625
[58] Field of Search ............ 384/7, 13, 26, 42, 492, 384/513, 548, 569, 625

[56] References Cited

U.S. PATENT DOCUMENTS

| | | | |
|---|---|---|---|
| 4,509,803 | 4/1985 | Takenaka et al. | 384/13 |
| 4,659,241 | 4/1987 | Bamberger et al. | 384/492 X |
| 4,893,387 | 1/1990 | Akamatsu et al. | 29/121.1 |
| 5,019,738 | 5/1991 | Weilbach et al. | 384/625 X |
| 5,064,298 | 11/1991 | Hibi et al. | 384/625 |
| 5,147,140 | 9/1992 | Murakami et al. | 384/492 |

FOREIGN PATENT DOCUMENTS

| | | |
|---|---|---|
| 1-30008 | 6/1989 | Japan . |
| 2-130205 | 5/1990 | Japan . |
| 2-168021 | 6/1990 | Japan . |
| 3-117723 | 5/1991 | Japan . |
| 3-117724 | 5/1991 | Japan . |
| 3-117725 | 5/1991 | Japan . |
| 4-54312 | 2/1992 | Japan . |

*Primary Examiner*—Thomas R. Hannon
*Attorney, Agent, or Firm*—Foley & Lardner

[57] ABSTRACT

A part with excellent wear resistance when subjected to both sliding friction and rolling friction has a layer in the range from 0 to 50 microns beneath the surface with a maximum compressive residual stress of at least 90 kgf/mm$^2$, and a hardness of at least Hv 780. The average radius of curvature of tips of minute protrusions existing on the surface is made at least 90 microns.

1 Claim, 3 Drawing Sheets

ROLLING/SLIDING PART

BACKGROUND OF THE INVENTION

1. Field of the Invention

The present invention relates to a rolling/sliding part used for example as a cam follower, or as a raceway ring or rolling element in a rolling bearing.

2. Description of the Prior Art

A rolling/sliding part is placed in rolling and/or sliding contact with a mating part during use, as with a cam follower, or a raceway or rolling element of a rolling bearing.

There are several known inventions related to improving the surface condition of the rolling/sliding part to enhance the durability of the surface (raceway surface or rolling surface).

For example, Publication of Examined JP Patent Application No. H1-30008 discloses a bearing rolling element having a surface layer in which a residual stress of over 50 kgf/mm² is created, and a rolling surface with scratches formed on it and extending in random directions so as to have a maximum roughness (Rmax) of 0.3–1.5 microns.

Furthermore, Publication of Unexamined JP Patent Application Nos. H2-130205, H2-168021, H3-117723, H3-117724, H3-117725, and U.S. Pat. No. 4,893,387 disclose inventions wherein a multiplicity of recesses are formed in random directions on the surface of such a rolling/sliding part by a barrelling process, so that the RMS (roughness means square) ratio is controlled, and the surface layer is made higher in hardness than the interior with a compressive residual stress produced in the surface layer.

Moreover, Publication of Unexamined JP Patent Application No. H4-54312 discloses an invention related to a bearing part, wherein a shot peening process is used to produce a compressive residual stress greater than 100 kgf/mm² in the surface layer, and greater than 40 kgf/mm² in a portion 300 microns (μm) below the surface.

With the rolling/sliding part disclosed in the above inventions, excellent durability can be achieved depending on the conditions of use. However, adequate durability is not always possible when the rolling/sliding part is used under conditions of insufficient lubrication, which is the object of the present invention, such as when the rolling/sliding part is used in rolling or sliding contact with another part.

For example, with the disclosure of JP Examined Patent application No. H1-30008, in which only the surface roughness is specified, the wear condition at the tips of the minute protrusions existing on the surface cannot be improved, and when the lubricating condition is severe (insufficient lubrication) there is the possibility of wear progressing at an early stage. That is to say, when the rolling/sliding part is used under severe lubrication conditions, the tips of the minute protrusions make direct contact with the surface of the mating material without the intervention of a thin film of lubricating oil. As a result, wear advances from the tips and wear of the surface progresses rapidly.

Also with the inventions disclosed in Publications of Unexamined JP Patent Application Nos. H2-130205, H2-168021, H3-117723, H3-1177234, H3-117725, and U.S. Pat. No. 4,893,387, a substantially similar problem exists.

SUMMARY OF THE INVENTION

It is an object of the present invention to provide a solution to the above problems. With this in mind, the present inventors carried out research to investigate the prevention of wear generation under the above types of conditions, and found that the condition of the tips of the minute protrusions existing on the surface together with the maximum compressive residual stress and hardness of the surface had a significant influence on the progress of wear.

DESCRIPTION OF THE PREFERRED EMBODIMENTS

Figure 1:
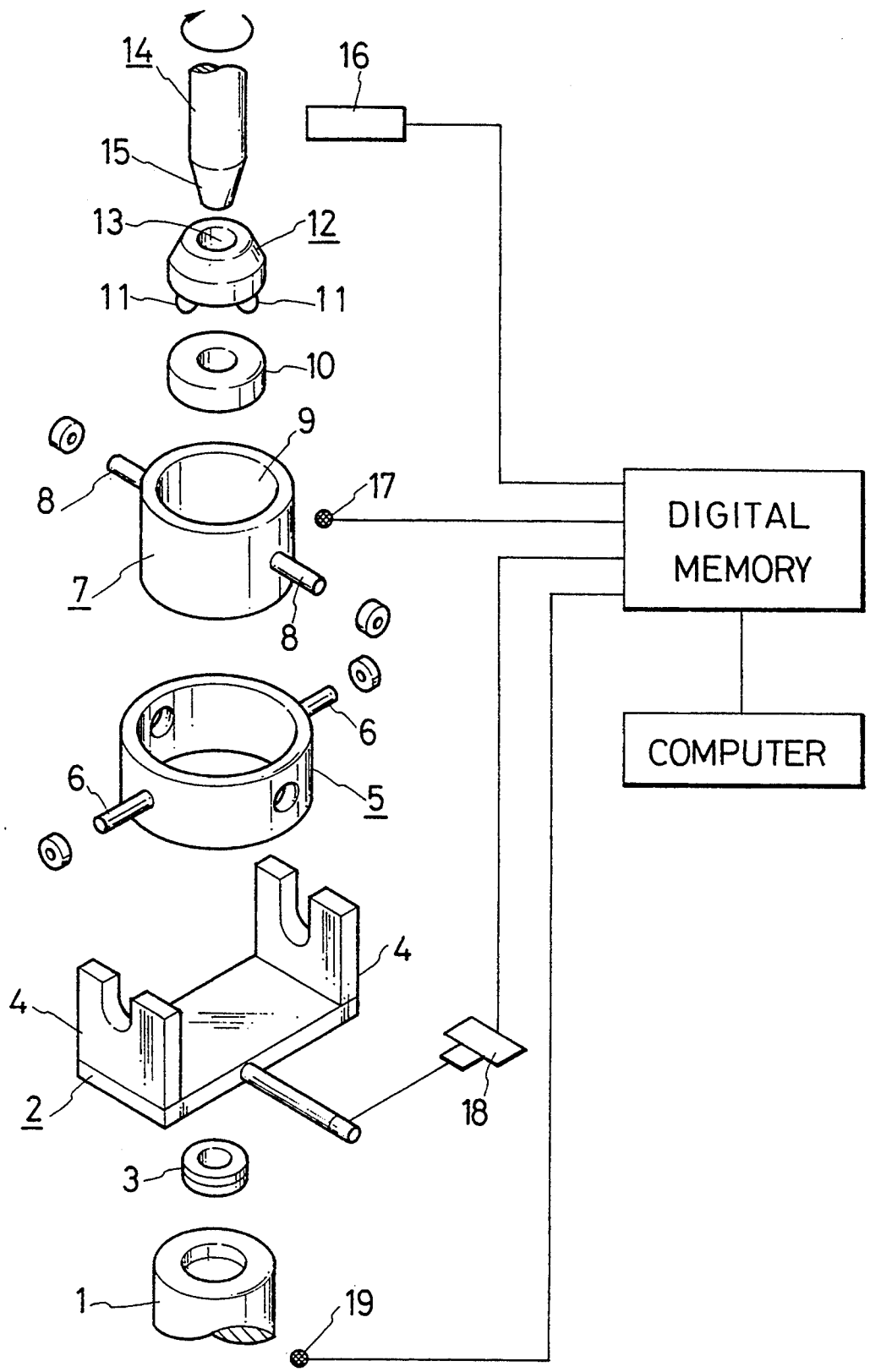
FIG. 1 is a schematic exploded view of the wear test equipment.

With the present invention, the rolling/sliding part is used in rolling or sliding contact with another part which mates to the rolling/sliding part. A surface layer of the rolling/sliding part in the range from 0 to 50 microns beneath the surface has a maximum compressive residual stress of at least 90 kgf/mm² and a hardness of at least Hv 780, and the average radius of curvature of the tips of the minute protrusions existing on the surface of the part is at least 90 microns.

With the above rolling/sliding part, since the surface layer has the large maximum compressive residual stress and hardness together with the large average radius of curvature at the tips of the minute protrusions, then even when used with insufficient lubrication, the stress applied to the tips of the minute protrusions is kept low thereby enabling wear of the tips to be reduced.

More specifically, when used under extreme conditions of insufficient lubrication, then the rolling/sliding part comes, only at the tips of the minute protrusions formed on its surface, into direct contact with the surface of the mating part without the intervention of a lubricating film. Since most of the load applied to the rolling/sliding part is supported by these minute protrusions in contact with the mating part, a large stress is concentrated on these protrusions.

If the tips of the minute protrusions are formed in a pointed shape, in other words has a small radius of curvature, an excessive stress concentration occurs resulting in plastic deformation initiating at the tips. This stress concentration results in remarkable wear in the contact surface when the rolling/sliding part makes rolling contact or sliding contact with the mating part.

With the rolling/sliding part of the present invention, since the maximum compressive residual stress and the hardness of the surface layer is made large, it is difficult for the plastic deformation as mentioned above to occur. Furthermore, since the tips of the minute protrusions has a large average radius of curvature, the excessive stress concentration at the tips is avoided. As a result, deformation of the tips of the minute protrusions is made extremely difficult, and wear of the contact surface is considerably reduced.

The following is an example of methods of producing a predetermined surface condition for the rolling/sliding part of the present invention, together with an explanation of the experiments carried out by the inventor to confirm the results.

In carrying out the experiments, a total of five kinds of test pieces were prepared as shown in the following Table 1. Two test pieces were prepared according to the present invention, and three were prepared as comparative test pieces. All test pieces were made of bearing steel (SUJ2), and heat treated in the standard way, that is heat-treated at a temperature from 800° C. to 850° C. followed by oil-quenching, and then tempered at a temperature from 150° C. to 200° C. before processing the surfaces according to the present invention. The test pieces were formed in a disk shape of 60 mm outside diameter by 16 mm thick with a hole of 28 mm diameter formed centrally through the side faces, giving a test receiving face of donut shape.

With Test Piece No. 1 of the comparative test pieces, the surface was only ground through cross polishing to give finishing marks perpendicular to the circumferential direction, and was not subjected to processes such as barrelling and shot peening for hardening the surface. Furthermore, with the four Test Pieces No. 2 to No. 5, covering the group of comparative test pieces and those of the present invention, all were subjected to surface hardening by barrelling to produce a significant compressive residual stress in the surface layer, and to crush the tips of the minute protrusions existing on the surface to increase the protrusion tip radius.

TABLE 1

| Test piece No. | Surface Finish | Hv | RMS ($\mu$m) | Protrusion Radius ($\mu$m) | Surface Comp. Residual Stress (kgf/mm$^2$) |
|---|---|---|---|---|---|
| 1 | cross polish | 694 | 0.495 | 38.0 | 50 |
| 2 | barrelling A | 776 | 0.524 | 48.8 | 100 |
| 3 | barrelling B | 725 | 0.472 | 94.8 | 90 |
| 4 | barrelling C | 784 | 0.418 | 126.0 | 100 |
| 5 | barrelling C | 780 | 0.482 | 93.0 | 90 |

No. 1 to No. 3: Comparative Test Pieces
No. 4 to No. 5: Test Pieces according to the present invention The "protrusion radius" considered herein is the radius of curvature of the minute protrusions existing on the surface of the test piece, and was determined from calculations based on the roughness curves of FIGS. 2 to 7, to be equal to the radius of the outer contact circle of a triangle formed by joining the protrusion apex with the preceding and following points. The direction of measurements in surface roughness used for obtaining the protrusion radius corresponds to the sliding direction of the steel balls 11. Each of the measurements were made at 10 locations in the peripheral direction, of which the average value is given in the above table.

Prior to carrying out barrelling, all of the test pieces No. 2 to No. 5 were ground to form finishing marks on the surfaces of the test pieces perpendicular to the circumferential direction. The Test Pieces No. 2 to No. 5 with their surfaces ground in this way were subjected to a barrelling process respectively, by placing them together with media and compound into a barrelling processor (Shinto Blater Co. Ltd., Model EVF-04-0C). Ceramic type media AF-T15 (referred to below as first media) and the media V3-B4 (referred to below as second media) made by the same company was used either separately in the case of Test Pieces No. 2 and No. 3 or together in the case of Test Pieces No. 4 and No. 5.

The first media was in the form of triangular prisms with each edge 15 mm long and a thickness of 10 mm, while the second media was in the form of 4 mm diameter balls. Lasterol B produced by the same company was used for the compound. Processing was carried out for three periods of 30, 40, and 60 minutes, and the test piece with the best condition was submitted to the friction test which is detailed hereinafter.

The values for Hv hardness, RMS, protrusion radius, and surface compressive residual stress for the various test pieces obtained by the above processes are given in the Table 1.

In the Table 1, Barrelling Condition A means the barrelling process carried out using the first media only, Barrelling Condition B means the barrelling process carried out using the second media only, while Barrelling Condition C means the barrelling process with a first step barrelling process using the first media followed by a second step process using the second media. Test Piece 4 was subjected to a longer overall process time compared to that for Test Piece 5. In particular, the second step process time using the second media was increased in Test Piece 4.

Test pieces No. 1 to No. 4 obtained in the above manner were subjected to friction tests using the test equipment shown in FIG. 1.

This equipment comprises a support 1, a base 2 supported on the support 1 by means of a thrust bearing 3. A gimbal apparatus mounted on the base 2 comprises an external pivotal support ring 5 pivotally supported on a pair of walls 4 provided on the base 2 so as to allow free swinging movement about shafts 6, and an internal pivotal support ring 7 pivotally supported inside the support ring 5 so as to allow free swinging movement about shafts 8 disposed at right angles to shafts 6.

The inner pivotal support ring 7 has a concavity 9 formed as an oil cup in the upper surface of the inner pivotal support ring 7 so as to contain the test piece 10 in it. With this arrangement, the upper surface of the test piece 10 was able to slide and change position freely in any direction. The concavity 9 was filled with a VG32 lubricant to provide lubrication to the friction surface of steel balls 11 and the upper surface of the test piece 10. The minimum oil film thickness determined by the Hamrock-Dowson test was 0.03 microns.

In the tests, three steel balls 11 made of bearing steel with an outer diameter of 15/64 inches and a hardness of Hv740 were pressed by a press member 12 against the upper annular surface of the test piece 10 contained within the concavity 9. The balls were supported in the press member 12 so as to rotate freely.

The press member 12 was formed with a tapered hole 13 centrally located in the upper surface and tapered with decreasing inner diameter towards the interior of the press member 12 so as to tightly accommodate a tapered portion 15 formed on the lower end of a spindle 14.

During the friction test, the spindle with the tapered portion 15 tightly engaged in the tapered hole 13 was pressed resiliently downwards and rotated under an axial load of 294N, to rotate the steel balls 11 relative to the upper surface of the test piece 10 and produce friction between the steel balls 11 and the upper surface of the test piece 10.

For the sliding friction tests, the steel balls 11 were fixed to the lower surface of the press member 12, while for the rolling friction tests they were free to rotate.

FIG. 1 shows a tachometer 16 for detecting the rotational speed of the spindle 14, a thermocouple 17 for measuring the temperature of the seating portion of the test piece 10, a load cell 18 for measuring the load in the rotating direction applied to the support base 2, and a load sensor 19 for measuring the axial load applied to the support 1. These instruments were used for ensuring conformity of the test conditions.

The tests were run at a sliding or rolling speed of approximately 0.5 m/g until the sliding or the rolling distance reached 5000 m for a single steel ball, or 15000 m for the total of the three steel balls. After the tests, the surface roughness of the respective test pieces 10 was measured in a direction perpendicular to the sliding direction of the steel balls 11,11. Results such as those shown in FIGS. 2–7 were obtained.

Figure 4:
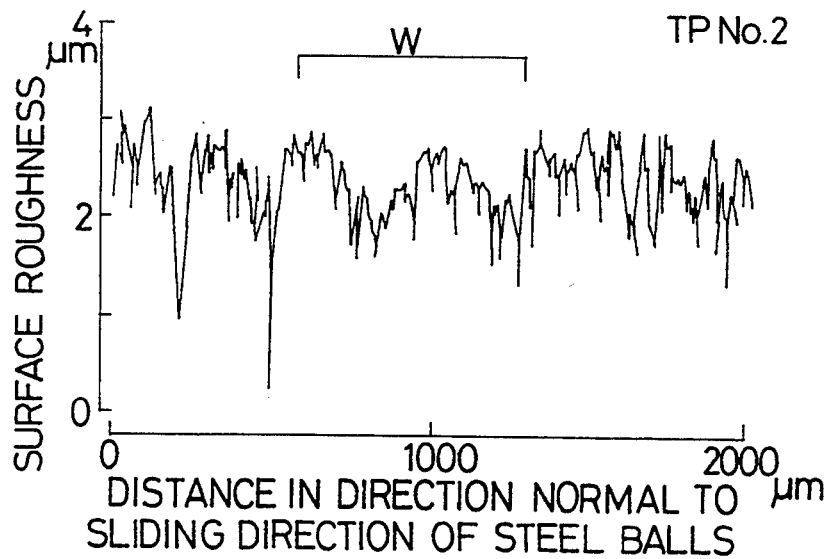
FIG. 4 is a magnified surface pattern graph showing the results of the sliding friction test for Test Piece No. 2.
Figure 5:
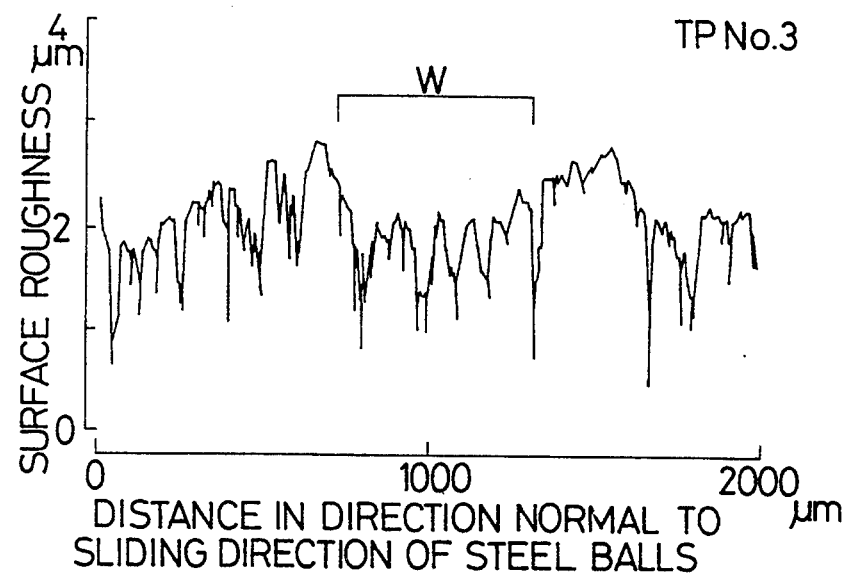
FIG. 5 is a magnified surface pattern graph showing the results of the sliding friction test for Test Piece No. 3.
Figure 6:
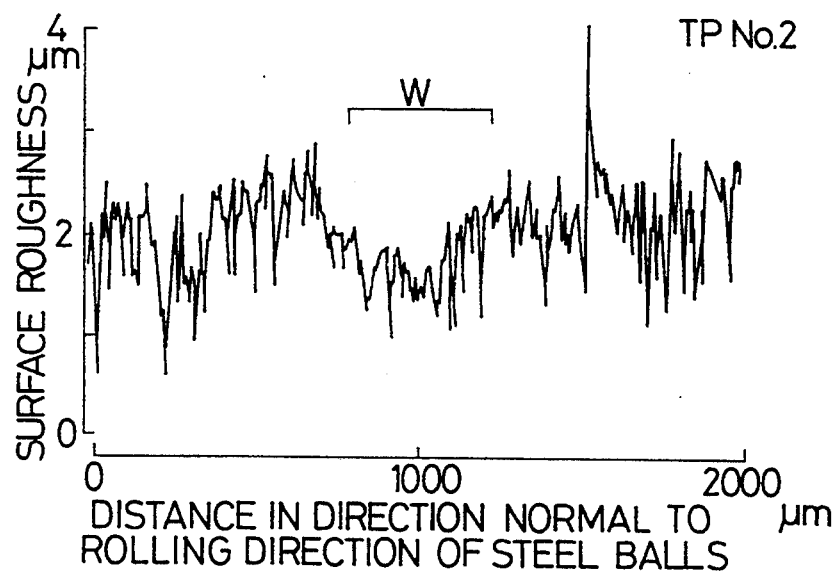
FIG. 6 is a magnified surface pattern graph showing the results of the rolling friction test for Test Piece No. 2.
Figure 7:
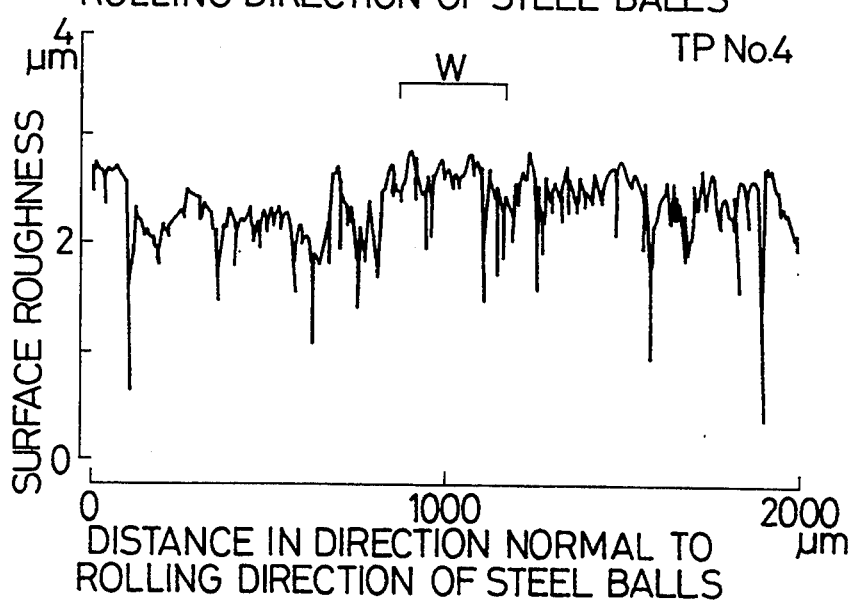
FIG. 7 is a magnified surface pattern graph showing the results of the rolling friction test for Test Piece No. 4.

FIGS. 2 to 5 show the results in the sliding friction tests carried out with the steel balls 11 fixed to the press member 12, while FIGS. 6 and 7 show the result in the rolling friction tests carried out with the steel balls 11 not fixed to the press member 12.

Figure 2:
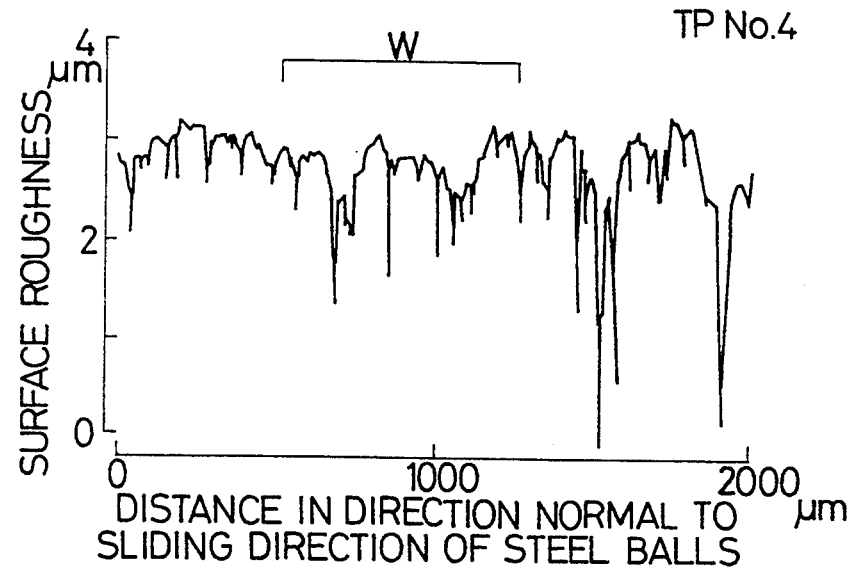
FIG. 2 is a magnified surface pattern graph showing the results of the sliding friction test for Test Piece No. 4.
Figure 3:
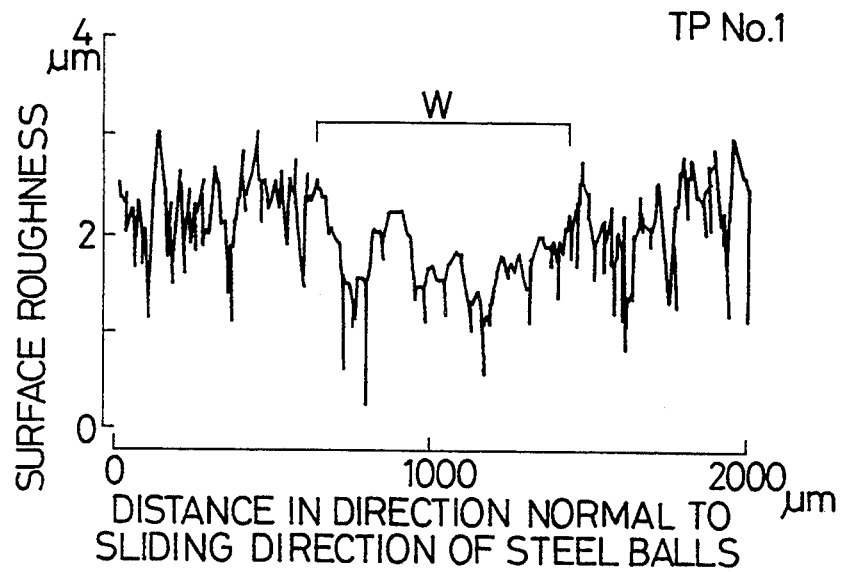
FIG. 3 is a magnified surface pattern graph showing the results of the sliding friction test for Test Piece No. 1.

FIG. 2 is for Test Piece No. 4 (present invention) in the Table, FIG. 3 is for Test Piece No. 1, FIG. 4 is for Test Piece No. 2, and FIG. 5 is for Test Piece No. 3. In addition, FIG. 6 is for Test Piece No. 2, while FIG. 7 is for Test Piece No. 4 (present invention).

With the graph lines in FIGS. 2 to 7 for the surface roughness of the various test pieces, the respective regions indicated by W show the worn portions caused by sliding or rolling contact of the steel balls 11.

As is apparent from FIGS. 2 to 7, the occurrence of wear at the contact portion of the rolling/sliding portion of the present invention is remarkably reduced for both sliding and rolling contact with the mating portion, indicating excellent durability. As shown in FIGS. 2 and 7 for Test Piece No. 4 of the present invention, there was practically no wear for either the sliding friction test (FIG. 2) or the rolling friction test (FIG. 7). On the other hand, FIGS. 3 and 5 for Comparative Test Piece Nos. 1 and 3 show excessive wear due to sliding friction. With Comparative Test Piece No. 2, although wear did not occur to the same extent as for Test Piece Nos. 1 and 3 in the sliding friction test shown in FIG. 4, there was significant wear with the rolling friction test shown in FIG. 6.

The results show the rolling/sliding part of the present invention to have excellent resistance to wear under both sliding friction and rolling friction, making improved durability for various types of mechanical equipment possible. These results may have particular significance in industrial applications since inspection periods for mechanical equipment may be increased, with the possibility of maintenance free equipment.

What is claimed is:

1. A rolling/sliding part for use in rolling or sliding contact with another part, having minute protrusions with tips for defining a surface and a surface layer in the range from 0 to 50 microns beneath the surface, the surface layer having a maximum compressive residual stress of at least 90 kgf/mm$^2$ and a hardness of at least Hv 780, and the tips of minute protrusions having an average radius of curvature of at least 90 microns.

* * * * *

UNITED STATES PATENT AND TRADEMARK OFFICE
CERTIFICATE OF CORRECTION

PATENT NO. : 5,333,954
DATED : August 2, 1994
INVENTOR(S) : NOGUCHI et al.

It is certified that error appears in the above-indentified patent and that said Letters Patent is hereby corrected as shown below:

Column 1, line 66, contains a typographical error wherein "H3-1177234" should read --H3-117724--.

Signed and Sealed this

Twenty-first Day of March, 1995

*Attest:*

BRUCE LEHMAN

*Attesting Officer*     *Commissioner of Patents and Trademarks*